United States Patent
Pallen et al.

(10) Patent No.: US 7,169,218 B2
(45) Date of Patent: Jan. 30, 2007

(54) INK JET SET FOR REDUCING INTERCOLOR BLEED

(75) Inventors: Eric Pallen, Rochester, NY (US); Lisa A. Delouise, Rochester, NY (US); Michael Keymel, Rochester, NY (US); Garret Lau, Fairport, NY (US); Pinyen Lin, Rochester, NY (US); Hiep Ly, Middletown, DE (US); David M. Skinner, Rochester, NY (US); Erin M. Reinhardt, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/995,838

(22) Filed: Nov. 23, 2004
(Under 37 CFR 1.47)

(65) Prior Publication Data
US 2006/0109323 A1 May 25, 2006

(51) Int. Cl.
*C09D 11/02* (2006.01)

(52) U.S. Cl. ............... 106/31.27; 106/31.6; 106/31.58; 106/31.86

(58) Field of Classification Search ............ 106/31.27, 106/31.6, 31.58, 31.86
See application file for complete search history.

(56) References Cited

U.S. PATENT DOCUMENTS

| | | | |
|---|---|---|---|
| 4,251,824 A | 2/1981 | Hara et al. | |
| 4,410,889 A | 10/1983 | Bryant et al. | |
| 4,412,224 A | 10/1983 | Sugitani | |
| 4,436,359 A | 3/1984 | Kasper et al. | |
| 4,532,530 A | 7/1985 | Hawkins | |
| 4,601,777 A | 7/1986 | Hawkins et al. | |
| 5,139,574 A | 8/1992 | Winnik et al. | |
| 5,145,518 A | 9/1992 | Winnik et al. | |
| 5,273,573 A * | 12/1993 | Kappele | 106/31.51 |
| 5,281,261 A | 1/1994 | Lin | |
| 5,534,051 A * | 7/1996 | Lauw | 106/31.43 |
| 5,851,273 A * | 12/1998 | Morris et al. | 106/31.27 |
| 6,395,079 B1 * | 5/2002 | Sano | 106/31.59 |
| 6,436,179 B1 * | 8/2002 | Hiraoka et al. | 106/31.58 |
| 6,482,256 B1 * | 11/2002 | Kanaya et al. | 106/31.51 |
| 6,500,248 B1 * | 12/2002 | Hayashi | 106/31.86 |
| 6,682,589 B2 * | 1/2004 | Morris et al. | 106/31.48 |
| 2002/0100392 A1 * | 8/2002 | Sano et al. | 106/31.6 |

* cited by examiner

*Primary Examiner*—David Sample
*Assistant Examiner*—Veronica Faison-Gee
(74) *Attorney, Agent, or Firm*—Eugene O. Palazzo; Fay, Sharpe, Fagan, Minnich & McKee, LLP

(57) ABSTRACT

An ink set for reducing intercolor bleed and a multi-colored ink jet printing process utilizing the same is provided. The ink set comprises a black ink composition and a plurality of color ink jet ink compositions comprising a colorant and an ink vehicle. The ink vehicle of at least one of the color inks matches the ink vehicle of the black ink. An ink set may also be a hybrid ink set comprising a black/color ink subset that includes a black ink composition and at least one color ink composition, and a color/color ink subset that includes a plurality of color ink compositions, wherein the ink vehicle of the color ink composition(s) in the black/color ink subset matches the ink vehicle of the black ink composition and the ink vehicles of at least one of the color inks in the color/color subsets match the ink vehicle of another color ink in the color/color ink subset.

25 Claims, 5 Drawing Sheets

INK JET SET FOR REDUCING INTERCOLOR BLEED

BACKGROUND

The present disclosure relates, in various exemplary embodiments, to ink jet ink compositions and ink jet ink sets. Specifically, the present exemplary embodiments relate to ink compositions in an ink jet ink set that are designed to reduce intercolor bleed when the inks are printed onto a substrate.

Ink jet printing is a non-impact printing method that produces droplets that are deposited on a print substrate (recording medium) such as plain paper, coated paper, transparent film (transparency), textile, or the like, in response to electronic digital signals. For example, thermal or bubble jet drop-on-demand ink jet printers have found broad applications as output for personal computers in the office and at home.

In existing thermal ink jet printing processes, the printhead typically comprises one or more ink jet ejectors, each ejector includes a channel communicating with an ink supply chamber, or manifold, at one end and having an opening at an opposite end, referred to as a nozzle. A thermal energy generator, usually a resistor, is located in each of the-channels at a predetermined distance from the nozzles. The resistors are individually addressed with a current pulse to momentarily vaporize the ink within each respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print sheet. As the bubble begins to collapse, the ink remaining in the channel between the nozzle and the bubble starts to move toward the collapsing bubble, causing volumetric contraction of the ink at the nozzle resulting in the separation of the bulging ink from the nozzle as a droplet. The acceleration of the ink out of the nozzle while the bubble is growing provides sufficient momentum and velocity to propel the ink droplet in a substantially straight line direction towards a print substrate, such as a piece of paper. Subsequently, the ink channel refills by capillary action and is ready for the next repeating thermal ink jet process. Thermal ink jet processes are well known and described in, for example, U.S. Pat. Nos. 4,251,824, 4,410,889, 4,412,224, 4,463,359, 4,532,530, 4,601,777, 5,139,574, 5,145,518, and 5,281,261, the entire disclosures of which are incorporated herein by reference. Because the droplet of ink is emitted only when the resistor is actuated, this type of thermal ink jet printing is known as "drop-on-demand" printing. Other types of drop-on-demand printing such as piezoelectric ink jet printing and acoustic ink jet printing are also known.

Continuous ink jet printing is also known. In continuous ink jet printing systems, ink is emitted in a continuous stream under pressure through at least one orifice or nozzle. Multiple orifices or nozzles can be used to increase imaging speed and throughput. The ink is perturbed while being ejected from an orifice, causing the ink to break up into droplets at a fixed distance from the orifice. At the point of break-up, the electrically charged ink droplets pass through an applied electrode that switches on and off in accordance with digital data signals. Charged ink droplets pass through a controllable electric field that adjusts the trajectory of each ink droplet in order to direct it to either a gutter for ink deletion and recirculation or to a specific location on a recording substrate to create images.

In an ink jet printing apparatus, the printhead typically comprises a linear array of ejectors, and the printhead moves relative to the surface of the print substrate, either by moving the print substrate relative to a stationary printhead, or vice-versa, or both. In some types of apparatuses, at least a relatively small print head supplied with an ink moves across a print sheet numerous times in swaths in order to complete an image. For multicolor ink jet printing, a set of printheads and ink (e.g., cyan, magenta, yellow and black) can move across the print substrate numerous times in swathes and disperse selected inks in any desired pattern (e.g., ⅛, ¼, ½, fulltone (1/1)) according to digital signals. The speed of this type of single or multiple color ink jet printing on a substrate is determined by the moving speed of the printheads across the print substrate, ink jetting frequency (or frequency response), and the desired number of swathes needed for printing. The printing speed of this type of ink jet apparatus can be increased if two or more print heads are budded together to form a partial-width array printhead for printing each ink in a monochrome or multicolor ink jet printing system. The partial-width ink jet printhead has more ink jet nozzles per printhead, and can deliver a large number of ink droplets across the substrate in a swath in a short period of time. Monochrome or multicolor ink jet printing apparatuses using one or several partial-width printheads may have a faster printing speed than current commercial ink jet printers.

Alternatively, a printhead that consists of an array of ejectors (e.g., several butted printheads to give a full-width array printhead) and extends the full width of the print substrate may pass an ink down once onto the print substrate to give full-page images, in what is known as a "full-width array printer". When the printhead and the print substrate are moved relative to each other, image-wise digital data is used to selectively activate the thermal energy generators in the ink jet printhead over time so that the desired image will be created on the print substrate at a fast speed. For multicolor ink jet printing, several full-width array printheads and inks (e.g., cyan, magenta, yellow, and black) can be used to deliver multiple color inks onto a print sheet. This type of multicolor ink jet printing process is capable of printing multiple color images and monochrome color images on a print substrate at a much faster speed (e.g., more than five pages of full color images per minute) than current commercial color ink jet printers.

In multicolor ink jet printing processes, several inks can be printed on a print substrate. In some instances, two different inks can be printed next to each other or one ink is printed on top of the other ink(s). Intercolor bleed can occur if the inks are not dried properly or if the printing process is too fast for the inks to set. Undesired ink mixing on a print substrate, especially on the surface of a plain paper, can cause distorted images near the border of two inks. After the inks dry, the border of the two inks can appear irregular with poor edge sharpness (or raggedness) due to the invasion of one ink into the other. Such bleed images are visibly unattractive. This phenomenon is generally called intercolor bleed. Intercolor bleed occurs particularly when a darker colored ink (such as a black ink) and a lighter colored ink (such as a yellow ink, a cyan ink, a magenta ink, or the like) are printed next to each other or on top of each other, because of the high contrast between the two colors. Intercolor bleed can also occur when two color inks are printed next to each other or on top of each other (for example yellow ink next to magenta ink, yellow ink next to cyan ink, magenta ink next to cyan ink or the like). The severity of the intercolor bleed generally is affected by the type and composition of the ink, absorption rate of the printer substrate, printhead design, ink drop mass, ink dot size and method and speed of printing. As a result, there is a need to reduce intercolor bleed and to produce high quality multicolor ink jet images on print substrates, including plain and coated papers, transparencies, textiles and other desired substrates.

Further, although carbon black inks are capable of producing good quality black images on North American and Japanese plain paper, they are not used as mainline black inks in multicolor printing process because they have tendency to exhibit poor intercolor bleed performance when printed next to color inks. The poor intercolor bleed performance of such inks is especially evident when such inks are printed next to yellow colored inks due to the high level of color contrast. In addition, although other black inks exhibit suitable intercolor bleed performance, these inks exhibit poor mid frequency line edge noise (MFLEN) data on Japanese paper.

Therefore, there remains a need for improved multicolor thermal ink jet printing processes. In addition, a need-remains for multicolor thermal ink jet printing processes wherein the print generated exhibits reduced intercolor bleed. Further, a need remains for multicolor thermal ink jet printing processes wherein the prints generated exhibit excellent image quality. In particular, there is an urgent need for an ink (especially a color ink) that provides good MFLEN (mid frequency line edge noise) and intercolor bleed performance when printed together with black inks to form multicolor images.

Attempts to reduce or eliminate intercolor bleed in ink jet printing processes typically involve the use of anti-intercolor bleed agents in the ink compositions. These agents are generally added to the color vehicle to "crash" the stability of the carbon black dispersion. The anti-intercolor bleed agent is often a salt. High levels of salt, however, are generally required to achieve the print quality latitude across a wide paper set. At high levels of salt, jetting, which is a key consideration in ink design, is degraded.

Therefore, there is also a need to provide both black and color ink jet ink compositions that do not require conventional anti-intercolor bleed agents but, when printed on a substrate, exhibit reduced intercolor bleed. Additionally, there is a need for an ink jet printing process employing such compositions. There is also a need to reduce the secondary color mottle, that is, to reduce the spotty or uneven appearance in the printing of secondary colors (e.g., green, red, etc.).

BRIEF DESCRIPTION

In accordance with one aspect of the present disclosure, an ink jet ink set is provided. The ink jet set comprises a black ink composition comprising a colorant and an ink vehicle, and a plurality of colored ink compositions, each also comprising a colorant and a vehicle. The ink vehicle of at least one of the plurality of colored ink compositions matches the ink vehicle of the black ink composition.

In accordance with another aspect of the present disclosure, an ink jet ink set is provided comprising a black ink composition comprising a colorant and an ink vehicle, a first color ink composition comprising a colorant and an ink vehicle, a second color ink composition comprising a colorant and an ink vehicle, and a third color ink composition comprising a colorant and an ink vehicle, wherein at least one of the ink vehicles of the first, second, and third color ink compositions matches the ink vehicle of the black ink composition.

In accordance with still another aspect of the present disclosure, a multi-colored ink jet printing process is provided comprising printing onto a substrate, in any sequence, a first ink jet ink composition, a second ink jet ink composition of a different color than the first ink composition, a third ink jet ink composition of a different color than the first and second ink compositions, and a fourth ink jet ink composition of a different color than the first, second, and third ink compositions, wherein each of the first, second, third, and fourth ink compositions comprises a colorant and an ink vehicle, and the ink vehicle of at least two of the ink compositions matches each other.

In a further aspect, the present disclosure provides an ink jet ink set comprising a black/color ink subset, and a color/color ink subset. The black/color ink subset comprises a black ink composition comprising a colorant and an ink vehicle, and at least one color ink composition comprising a colorant and an ink vehicle, wherein the ink vehicle(s) of the color ink composition(s) in the black/color ink subset matches the ink vehicle of the black ink composition. The color/color ink subset comprises a plurality of ink compositions, each ink composition comprising a colorant and an ink vehicle, wherein the ink vehicle of at least one of the ink compositions matches the ink vehicle of another color ink vehicle in the color/color ink subset.

These and other non-limiting aspects of the disclosure are more particularly disclosed below.

BRIEF DESCRIPTION OF THE DRAWINGS

The following is a brief description of the drawings which is presented for the purposes of illustrating the disclosure described herein and not for the purposes of limiting the same.

DETAILED DESCRIPTION

Figure 1:
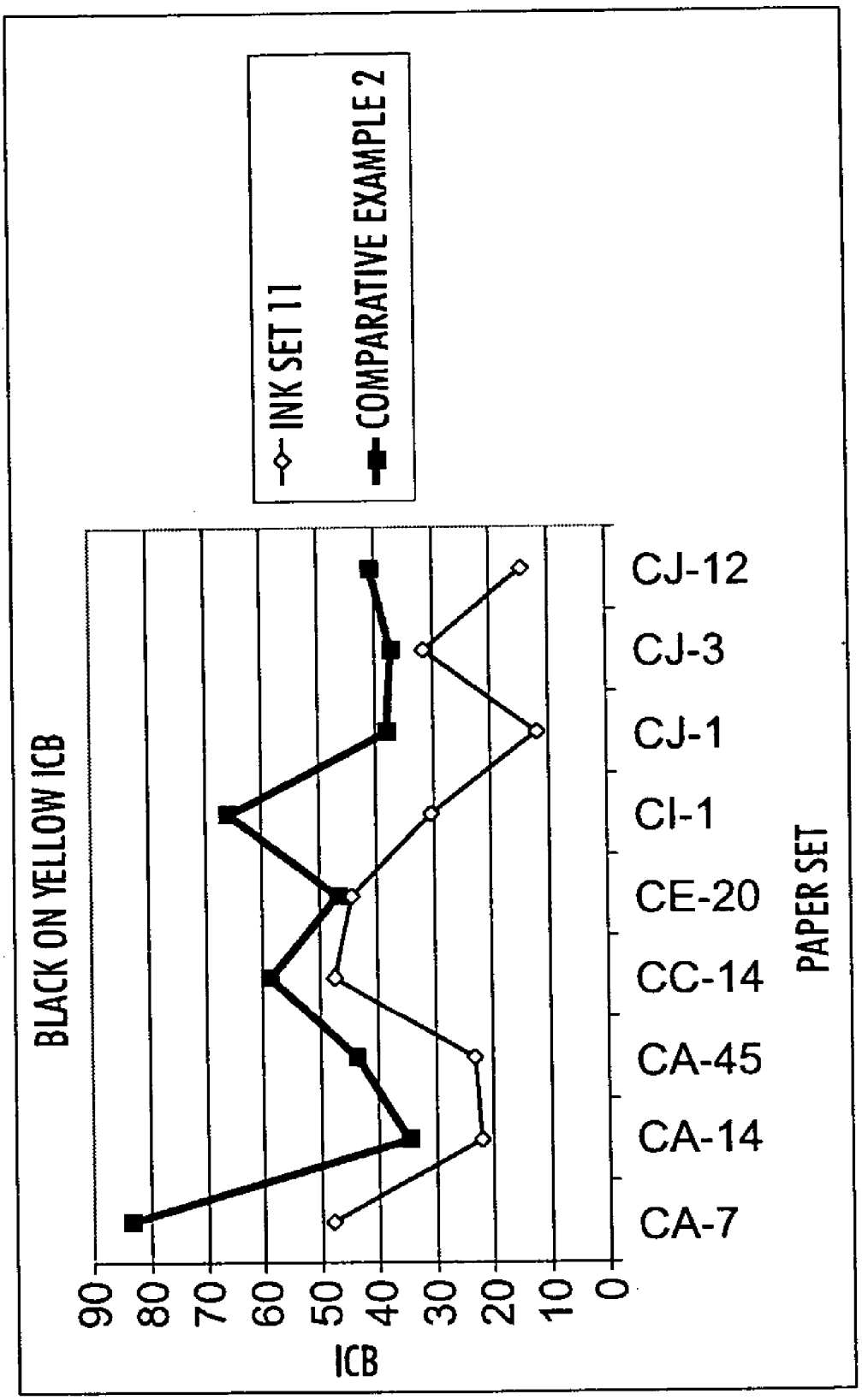
FIG. 1 is a graph comparing the black on yellow intercolor bleed of different ink sets on various papers.

The present disclosure relates, in various exemplary embodiments, to ink compositions and, more particularly, to ink designs or ink sets for a multi-colored ink jet printing process. The ink sets comprise a plurality of ink jet ink compositions to be deposited on a substrate during an ink jet printing process. Each of the ink jet ink compositions comprises a colorant and an ink vehicle. In embodiments, each ink composition in a given ink set has a color different than the other ink compositions.

Unless otherwise stated, as used herein, the terms "colored ink" or "color ink" refer to an ink composition wherein the colorant is a color other than black.

Ink compositions usually contain a vehicle, or dispersing medium, present in amounts of from, for example, about 40 to about 90 weight percent, and providing the total of all ink components is equal to about 100 percent, or 100 parts. In embodiments, the dispersing medium is present in an amount of from about 80 to about 90 weight percent of an ink composition.

The liquid vehicle of the inks may be comprised of water, or water and a miscible organic component, or cosolvent. Examples of suitable cosolvents include, but are not limited to, glycols, such as ethylene glycol, propylene glycol, diethylene glycols, triethylene glycols, thioglycol, glycerin, dipropylene glycols, and polyethylene glycols; polypropylene glycols, amides such as urea and substituted ureas; ethers such as ethylene glycolmonomethyl ether, ethylene glycolmonoethyl ether, diethylene glycolmonomethyl ether, diethylene glycolmonoethyl ether, diethylene glycolmonobutyl ether, propylene glycolmonomethyl ether, propylene glycolmonoethyl ether, propylene glycolmonobutyl ether, triethylene glycol ether, tripropylene glycol monomethyl ether; carboxylic acids and their salts, esters; alcohols such as ethyl alcohol, isopropyl alcohol, butyl alcohol, and benzyl alcohol; organosulfides, organosulfoxides, and sulfones; alcohol derivatives, carbitol, butyl carbitol, cellusolve, ether derivatives, amino alcohols; ketones, N-methylpyrrolidinone, 2-pyrrolidone, cyclohexyl-pyrrolidone, hydroxyethers, amides, sulfoxides such as dimethyl sulfoxide, lactones, mixtures thereof and the like.

When mixtures of water and one or more cosolvents or codispersants are selected as the liquid vehicle, the ratio of water to cosolvent may be in any effective range. In embodiments, the ratio of water to cosolvent is from about 100:0 to about 20:70. In other embodiments, the ratio of water to cosolvents is from about 97:03 to about 50:50, although other suitable ratios may be selected. The non-water component of the liquid vehicle, when present, generally functions as a humectant, which typically has a boiling point higher than that of water. For example, suitable humectants include, but are not limited to, glycols, N-methyl-pyrrolidone, 2-pyrrolidone, N-methyl-2-pyrrolidone, 1,2-dimethyl-2-imidazolidinone, sulfones, mixtures thereof and the like. Humectants may be included in the ink to prevent water evaporation and sedimentation. Additionally, certain humectants, such as N-methyl-pyrrolidone and 2-pyrrolidone, have been found to improve jetting performance in the ink and thus serve the dual function as a humectant and as a cosolvent. Further, some humectants, such as 2-pyrrolidone, resist ink and build up on jet faces during extended printing. Such resistance is desirable for cartridge refillability.

The colorant can be a pigment a dye, or a mixture thereof. The colorant is present in embodiments in an amount of from about 1 to about 20 weight percent of the ink composition. In other embodiments, the colorant is present in an amount of from about 2 to about 15 weight percent and, in further embodiments, from about 2 to about 12 weight percent. Suitable colorants include, but are not limited to, dyes, pigments or pigment particles, and mixtures thereof, mixtures of pigments, mixtures of dyes, and the like. For example, the colorant may be a pigment including, but not limited to, a cyan pigment, a magenta pigment, a yellow pigment, a red pigment, a blue pigment, or mixtures thereof.

In embodiments, the ink compositions possess a viscosity of from about 1.5 to about 5 centipoise, and a surface tension of from about 30 to about 55 dynes per centimeter. The ink compositions may further contain ink additives such as, for example, those selected from the group consisting of biocides, buffering agents, anti-mold agents, pH adjustment agents, electric conductivity adjustment agents, chelating agents, anti-rusting agents, anti-cockle agents, and stabilizing agents, and which components are selected for example, in an amount of from about 0.01 to about 10, or from about 0.1 to about 5 weight percent. The ink compositions more specifically can contain buffering agents of sodium borate, sodium hydrogen phosphate, sodium dihydrogen phosphate, or mixtures thereof; biocides of DOWICIL 150™, 200™, and 75™, benzoate salts, sorbate salts, or mixtures thereof; pH controlling agents of acids, bases of hydroxides of alkali metals of lithium hydroxide; phosphate salts; carbonate salts; carboxylate salts; sulfite salts; amine salts; amines of diethanolamine, and triethanolamine; and mixtures thereof; anticurl agents of trimethylolpropane, N-acetylethanolamine, N-N-diacetyl piperazine, triethylene glycol, N-(2-aminoethyl) ethanolamine, 1,4-butanediol, N-ethylformamide, 2-methyl-1,5-pentanediol, 1,5-pentanediol, diethylene glycol, 2,2'-oxybisethanol, and mixtures thereof; and/or chelating agents of ethylenediaminetetraacetic acid, and salts thereof; stabilizing agents of polyethylene oxide/bisphenol A polymer; and external salts of quaternary ammonium halide salts of ammonium chloride, ammonium bromide or lithium chloride.

In embodiments of the present disclosure, the colorant for the ink jet ink compositions may be a pigment, a dye, or mixtures thereof. Colorant examples include carbon black, cyan, magenta, yellow, red, blue, green, brown, mixtures thereof, and the like. Examples of suitable black colorants include various carbon blacks such as channel black, furnace black, lamp black, and the like, which may be used either as dry powders or in a predispersed form, such as the preferred Levanyl Black A-SF (Bayer), Sunsperse Carbon Black LHD 9303 (Sun Chemicals), other similar carbon black products available from Sun Chemicals, and other similar carbon black products available from Cabot Corporation. Illustrative examples of magenta pigments include 2,9-dimethyl-substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthrathrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of colorants include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF).

In embodiments, when pigments are selected, the pigment particle size is small to enable a stable dispersion of the particles in the presence of the resin emulsion. For example, particle average diameters may be from about 0.001 to about 1 micrometers. The pigments may be further processed to obtain an exemplary particle size of for example, from about 0.001 to about 1 micron in volume average diameter. The further processing may include the use of a ball mill, a sand mixer, an attritor, an agitator mill, an ultrasonic homogenizer, a microfluidizer, or centrifugation.

Dyes suitable as the colorant include, but are not limited to, acid, direct or reactive dyes. Specific examples of dyes include Bernacid Red 2BMN, Pontamine Brilliant Bond Blue A, BASF X-34, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX4GD, Procion Blue MX-G, and Procion Blue MX-2GN, all available from ICI; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Acid Yellow 17, Acid Red 52, and Direct Red 227, all available from Tricon; Projet Cyan 1, Projet Magenta 1T, and Projet Yellow 1G, all available from Zeneca; mixtures thereof, and the like. Dyes that are invisible to the naked eye but detectable when exposed to radiation outside the visible wavelength range, such as ultraviolet or infrared radiation, may also be used in the present ink compositions. Examples of such "invisible" dyes include dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl) benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl) coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS (available from Leucophor), and the like.

Mixtures of dyes and pigments may also be selected.

The present disclosure also relates, in various embodiments, to ink sets. An ink set comprises a plurality of inks. An ink set generally comprises inks of different colors, and may include two, three, four or more colors. In embodiments, an ink set includes, for example, a cyan ink, a magenta ink, a yellow ink and a black ink.

The present disclosure also relates to an ink jet printing process that includes printing the inks from an ink set. Intercolor bleed is controlled by the compositions of the inks and, in particular, the compositions of the ink vehicles. That is, the black/color intercolor bleed, the color/color intercolor bleed, or both black/color and color/color intercolor bleed, may be controlled via the selection of the ink vehicles of the respective ink compositions within an ink set. Specifically, black/color and/or color/color intercolor bleed may be controlled by matching the ink vehicles of selected ink compositions within an ink set. As used herein, "matching" ink vehicles have the same or substantially the same ink vehicle composition.

Black/color intercolor bleed may be controlled by matching the vehicle of a colored ink composition with the vehicle of the black ink composition. In embodiments, the black ink composition is a black composition employing a colorant such as, for example, a carbon black pigment. Matching the vehicle of one or more colored ink compositions with the vehicle of the black ink results in favorable solution thermodynamics and a lower $\Delta E$ of mixing. Without being bound to any particular theory, the favorable solution thermodynamics and the relatively lower mobility of the carbon black pigment results in lower black/color intercolor bleed levels. In embodiments, the ink vehicle of at least one color ink matches the ink vehicles of the black ink. In other embodiments, the vehicles of each of the color ink compositions in an ink set matches the ink vehicle of the black ink composition. In another embodiment, the vehicle of one of the color ink compositions matches with the vehicle of the black ink composition. For example, in an ink set comprising cyan, magenta, yellow, and black inks, the ink vehicle of one of the yellow, cyan, and/or magenta inks matches with the ink vehicle of the black ink. In still other embodiments, in an ink set comprising cyan, magenta, yellow and black inks, the vehicle of the yellow ink matches the vehicle of the black ink.

Generally, in embodiments, where the vehicles of one or more of the colored inks and the black ink are matched, the ink vehicle of the colored inks is matched to the ink vehicle of the black ink composition. That is, the composition of the ink vehicles of the colored inks will be made to be the same as or substantially the same as the vehicle used in a black ink composition. Black inks typically use slower drying vehicles than colored ink compositions. In embodiments, the vehicle of the black ink composition may be matched with the ink vehicles of the colored inks. However, matching the vehicle of the black ink composition with faster drying vehicles of colored inks may result in higher MFLEN values, higher black/color intercolor bleed and as compared to ink sets wherein the vehicle of colored ink is matched to a slower drying vehicle of a black ink, and lower black optical density. This may be due to the high penetration of drying agents, such as butyl carbitol, that may be used in the vehicles of colored ink compositions.

As described herein, in embodiments, the vehicles of each of the color inks can match the vehicle of the black ink in a given color set. While matching the vehicles of the colored ink compositions reduces the black/color intercolor bleed, color/color intercolor bleed and secondary mottle may increase when the vehicles of all the colored ink compositions in an ink set are matched to the vehicle of the black ink composition. Generally, this is caused by the slow drying nature of ink vehicles typically used in black ink compositions.

In embodiments, color/color intercolor bleed may be controlled by use of a hybrid ink set. A hybrid ink set comprises at least one ink subset. As used herein, an ink subset refers to a group of two or more ink compositions of different colors (including black) having matching ink vehicles. In embodiments, an ink subset includes two ink compositions of different colors (including black). For example, a black/color ink subset comprises a black ink and one or more color inks (other than black), wherein the ink vehicle of the color ink matches the ink vehicle of the black ink; a color/color ink subset may comprise two or more non-black color inks wherein the ink vehicles of the inks (in the color/color subset) match one another. Generally, the ink vehicles of the color inks in the color/color ink subset will not identically match the ink vehicle of the color ink in the black/color ink subset. In embodiments, the ink vehicles of the color inks in the color/color subset will generally be faster drying vehicles than the vehicle(s) of the black ink and/or the vehicle of the colored ink in the black/color ink subset. In other embodiments, the ink vehicles of the color/color ink subset may closely match the ink vehicles of the black/color ink subset, with the difference that an amount of water in the ink vehicles of the color/color ink subset is replaced with an effective amount of a drying agent such as, for example, butyl carbitol.

For example, in embodiments, a hybrid ink set includes black, cyan, magenta and yellow inks that are each part of one of a black/color and color/color ink subset. In embodiments, the black/color ink subset includes a black ink and a yellow ink, wherein the vehicle of the yellow ink matches the vehicle of the black ink, and the color/color ink subset includes a cyan ink and a magenta ink, wherein the vehicle of the cyan ink matches the vehicle of the magenta ink (or vice versa). In other embodiments, the black/color ink subset includes a black ink and a cyan ink, wherein the vehicle of the cyan ink matches the vehicle of the black ink, and the color/color ink subset includes a magenta and a yellow ink, wherein the vehicle of the yellow ink matches the vehicle of the magenta ink (or vice versa). In further embodiments, the black/color ink subset includes a black ink and a magenta ink, wherein the vehicle of the magenta ink matches the vehicle of the black ink, and the color/color ink subset includes a cyan ink and a yellow ink, wherein the vehicle of the cyan ink matches the vehicle of the yellow ink (or vice versa).

In further embodiments, the vehicle of the color ink in the black/color ink subset matches the ink vehicles of the color inks in the color/color ink subset with the exception that from about 5 to about 10 percent by weight of the water in the ink vehicles-of the inks in the color/color subset is replaced by a drying agent, such as, for example, butyl carbitol, while the black ink and the color ink in the black/color subset do not include such a drying component. In embodiments, the vehicle of the color inks identically match except that about 5 to about 10 percent of the water in the vehicles of the inks in the color/color inks subset is replaced with a drying agent. For example, the vehicle of the yellow ink may match the vehicle of the black ink. The vehicles of the cyan and magenta inks may each match the vehicle of the yellow ink, with the exception that about 5 to about 10 percent by weight of the water in the cyan and magenta vehicles is replaced with a drying agent such as, for example, butyl carbitol. It will be appreciated that the foregoing examples are merely illustrative embodiments of hybrid ink sets and that other permutations, formulations and colorant combinations are within the scope of this disclosure.

The inks from the ink sets of the present exemplary embodiment may be printed in any sequence. For example, in an ink set comprising black (K), cyan (C), magenta (M), and yellow (Y) inks, the ink printing sequence may be selected from the group consisting of a) K, C, M, Y; b) K, C, Y, M; c) K, M, C, Y; d) K, M, Y, C; e) K, Y, C, M; f) K, Y, M, C; g) Y, C, M, K; h) Y, M, C, K; i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; v) M, C, K, Y; w) M, K, Y, C; and x) M, K, C, Y. In embodiments, faster drying inks, i.e., the ink compositions comprising the faster drying vehicles, are laid down on the substrate before the slower drying inks. Laying down the faster drying color inks first reduces secondary color mottle.

For example, in one embodiment, an ink set includes a yellow ink with a vehicle that matches the vehicle of the black ink, and cyan and magenta inks having matching ink vehicles that are faster drying than the vehicles of the yellow and black inks. In such an ink set, secondary color mottle may be reduced by printing the colored inks, i.e., the yellow, cyan, and magenta inks, in the following order: C/M/Y.

The ink jet printing of inks and ink sets in accordance with the present disclosure may be accomplished in any suitable manner using any suitable apparatus or printer for printing ink jet inks. For example, printing may be carried out in a checkerboard, image-wise single pass or other suitable method (ink jet printing process).

The printing process may also be conducted using different printers employing various printing methods including, but not limited to, thermal ink jet printing, acoustic ink jet printing, continuous stream ink jet printing, piezoelectric printing, and the like. Additionally, printing may include jetting at least one ink through a printhead capable of printing at least about 360 spots per inch and, in embodiments, at least about 400 spots per inch, in other embodiments, at least about 500 spots per inch and, in further embodiments, at least about 600 spots per inch or more.

The present ink sets and printing processes, as described in the various exemplary embodiments, are further understood with reference to the following examples. The examples are merely exemplary and not intended to be limiting in any manner.

EXAMPLE I

The effect of matching the ink vehicles of a colored ink and a black ink on black/color intercolor bleed was examined. Several ink sets comprising black and yellow ink compositions were prepared. The ink sets differ in the ink vehicles used in each of the inks in the ink set. The composition of the ink vehicles used in this test is listed in Table 1 below. Ink vehicle A is considered to "match" ink vehicle C. The ink sets are shown in Table 2.

TABLE I

| Ink Vehicle | Components | Percent by Weight of Ink Vehicle |
| --- | --- | --- |
| A | 2-pyrrolidone | 7 |
|   | sulfolane | 15 |
|   | water | 74 |
| B | butyl carbitol | 11 |
|   | sulfolane | 7 |
|   | water | 64 |
| C | 2-pyrrolidone | 8 |
|   | sulfolane | 12 |
|   | diethylene glycol (DEG) | 2 |
|   | water | 70 |

The ink sets are listed in Table 2. For purposes of this test, identical ink vehicles are considered matching ink vehicles, and ink vehicle A is considered to "match" ink vehicle C. The inks were printed from a Xerox M750 printer onto three different substrates and the black/yellow intercolor bleed was determined. Samples 1–7 utilized matching ink vehicles. Table 2 shows the results of the tests.

TABLE 2

| | Ink Vehicles | | ICB Data | | | |
| --- | --- | --- | --- | --- | --- | --- |
| Ink Set | Black Ink | Yellow Ink | CA 14 Paper | CJ 3 Paper | CJ 12 Paper | Average ICB |
| 1* | C | A | 1.5 | 1.3 | 2.65 | 1.8 |
| 2** | C | A | 5.95 | 7.3 | 3.35 | 5.5 |
| 3* | A | A | 17.45 | 10.5 | 5.85 | 11.3 |
| 4** | A | A | 3.95 | 5.3 | 3.55 | 4.3 |
| 5 | B | B | 23.75 | 22.05 | 19.05 | 21.6 |
| 6 | C | C | 16.6 | 4.85 | 10.2 | 10.6 |
| 7*** | C | C | 10.95 | 4.0 | 1.75 | 5.6 |
| Comparative Example 1 | A | B | 66.3 | 59.9 | 69.2 | 65.0 |

*pH 6.60
**pH 7.30
***No Silwet

Ink sets comprising black, cyan, magenta, and yellow inks were also prepared. The compositions were prepared using the ink vehicles in Table 1 along with vehicles set forth below in Table 3.

TABLE 3

| Ink Vehicle | Components | Percent by Weight of Ink Vehicle |
| --- | --- | --- |
| D | 2-pyrrolidone | 6 |
|   | Sulfolane | 31 |
|   | water | 58 |
| E | Sulfolane | 15 |
|   | Butyl carbitol | 12 |
|   | AEA | 16 |
|   | water | 35 |
| F | 2-pyrrolidone | 7 |
|   | sulfolane | 15 |
|   | butyl carbitol | 10 |
|   | water | 64 |

The colored inks in Comparative Examples 2 and 3 are considered to not match the black ink vehicles. The colored inks of Sample 8 utilize an ink vehicle that matches the ink vehicle of the black ink composition. The inks were printed from a Xerox M750 printer onto nine different papers (7NT, CA14, CC14, CA45, CJ1, CJ3, CJ12, CI11, and CA7) and the black/color intercolor bleed was evaluated for each color. Table 4 presents the results of these tests, showing the average ICB value over the nine paper set.

TABLE 4

| | Ink Vehicles | | ICB Data | | |
| --- | --- | --- | --- | --- | --- |
| Ink Set | Black Ink | Color Ink (C, M, and Y) | K/Y ICB | K/C ICB | K/M ICB |
| 8 | C | A | 30.6 | 17.2 | 50.0 |
| Comparative Example 2 | D | E | 46.9 | 92.5 | 89.9 |
| Comparative Example 3 | C | E | 57.3 | 85.8 | 70 |

As seen from the data in Tables 2 and 4, matching the vehicle of color ink(s) to the ink vehicle of the black ink in an ink set reduces the black/color intercolor bleed. As shown in Sample 5, the black/color intercolor bleed may be reduced by matching the vehicle: of a black ink composition to a faster drying ink vehicle of a color ink. While the intercolor bleed of such a set may be higher than other ink sets where the color inks match the vehicles of a black ink, black/color intercolor bleed is still reduced as compared to ink sets, such as Comparative Examples 1–3, where matching ink vehicles are not utilized. In many instances, the black/color intercolor bleed can be significantly reduced as compared to ink sets that do not utilize two or more inks with matching vehicles.

EXAMPLE II

Hybrid Ink Sets

Figure 2:
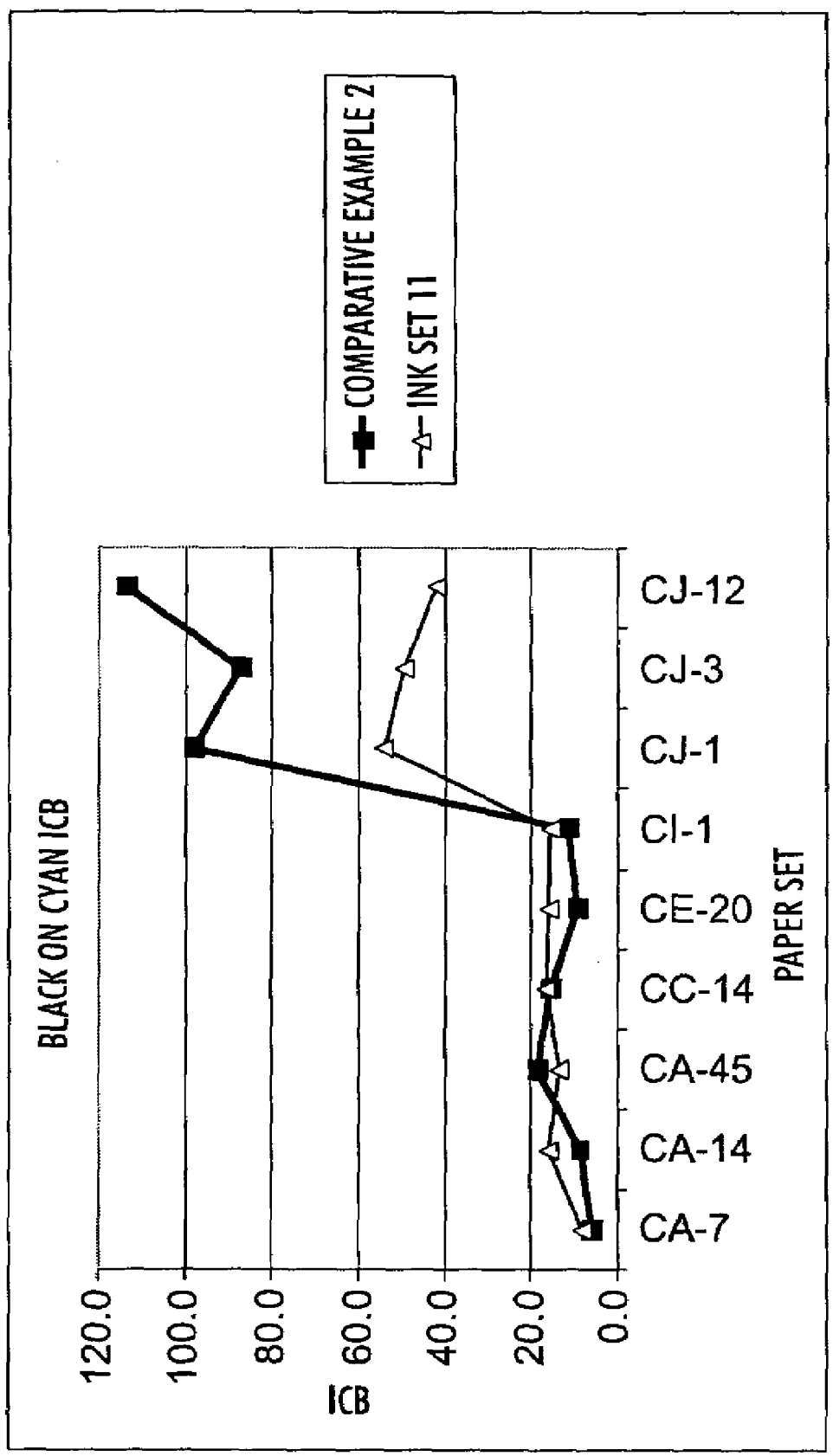
FIG. 2 is a graph comparing the black on cyan intercolor bleed of different ink sets on various papers.
Figure 3:
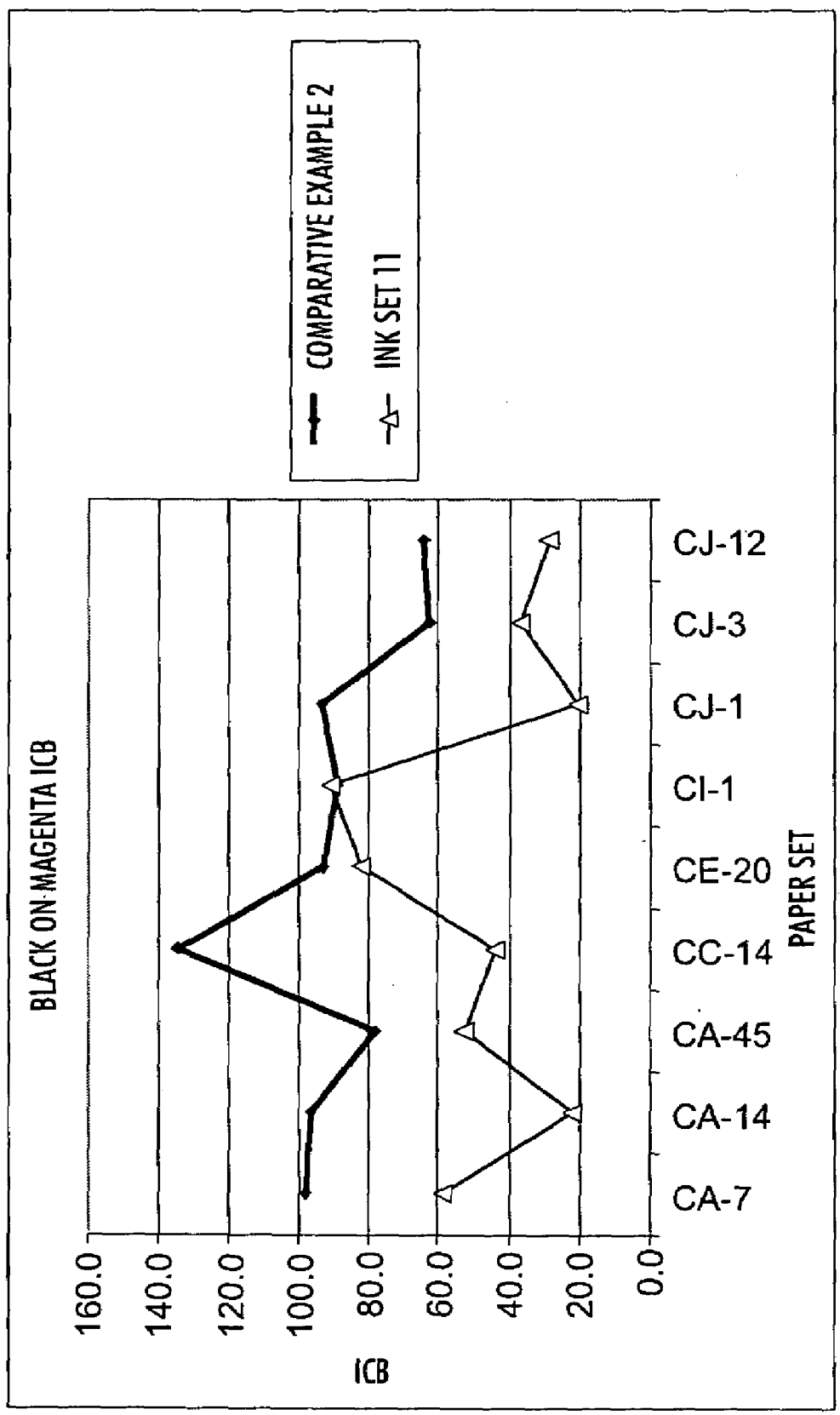
FIG. 3 is a graph comparing the black on magenta intercolor bleed of different ink sets on various papers.
Figure 4:
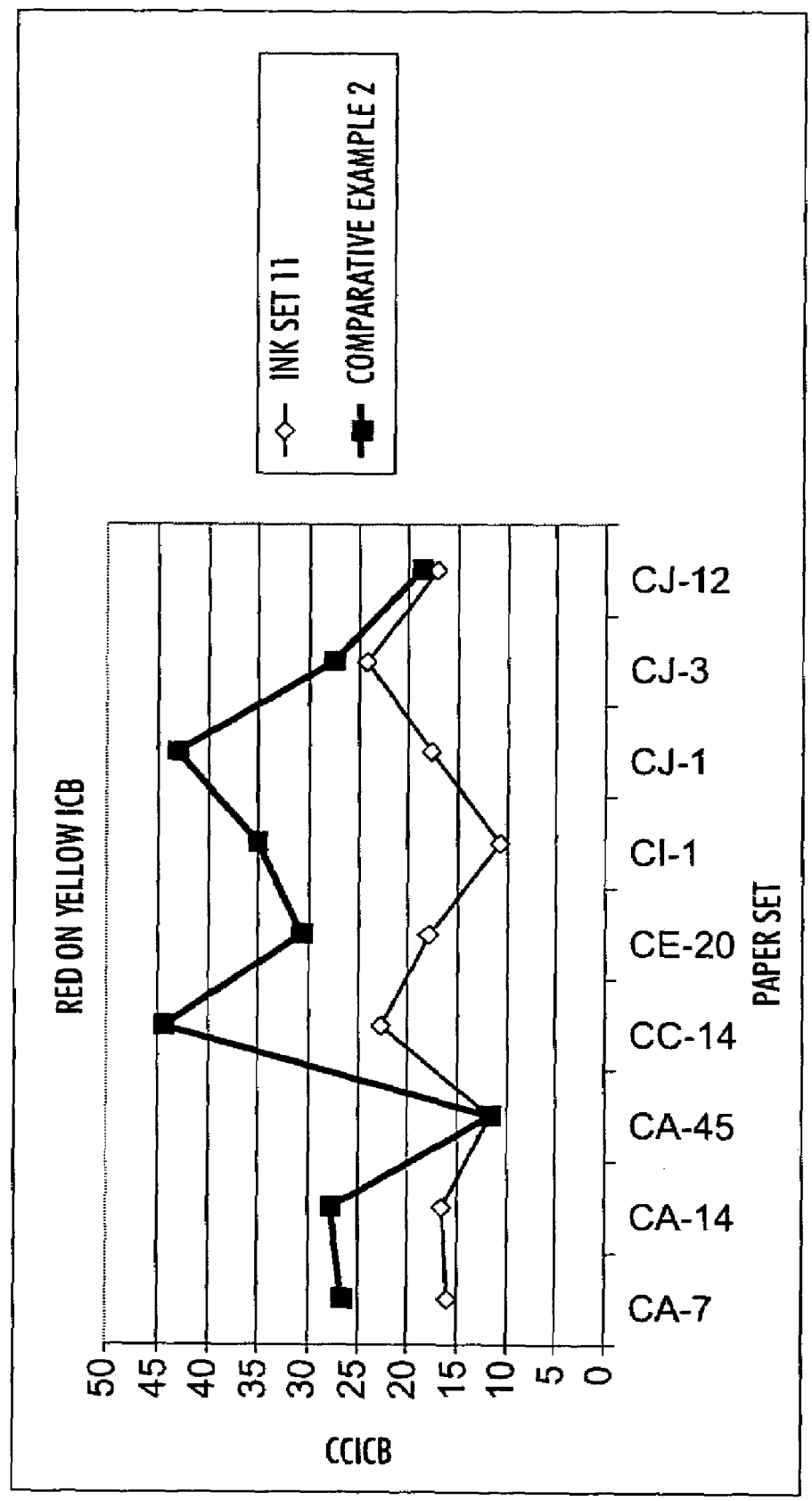
FIG. 4 is a graph comparing the red on yellow intercolor bleed of different ink sets on various papers.
Figure 5:
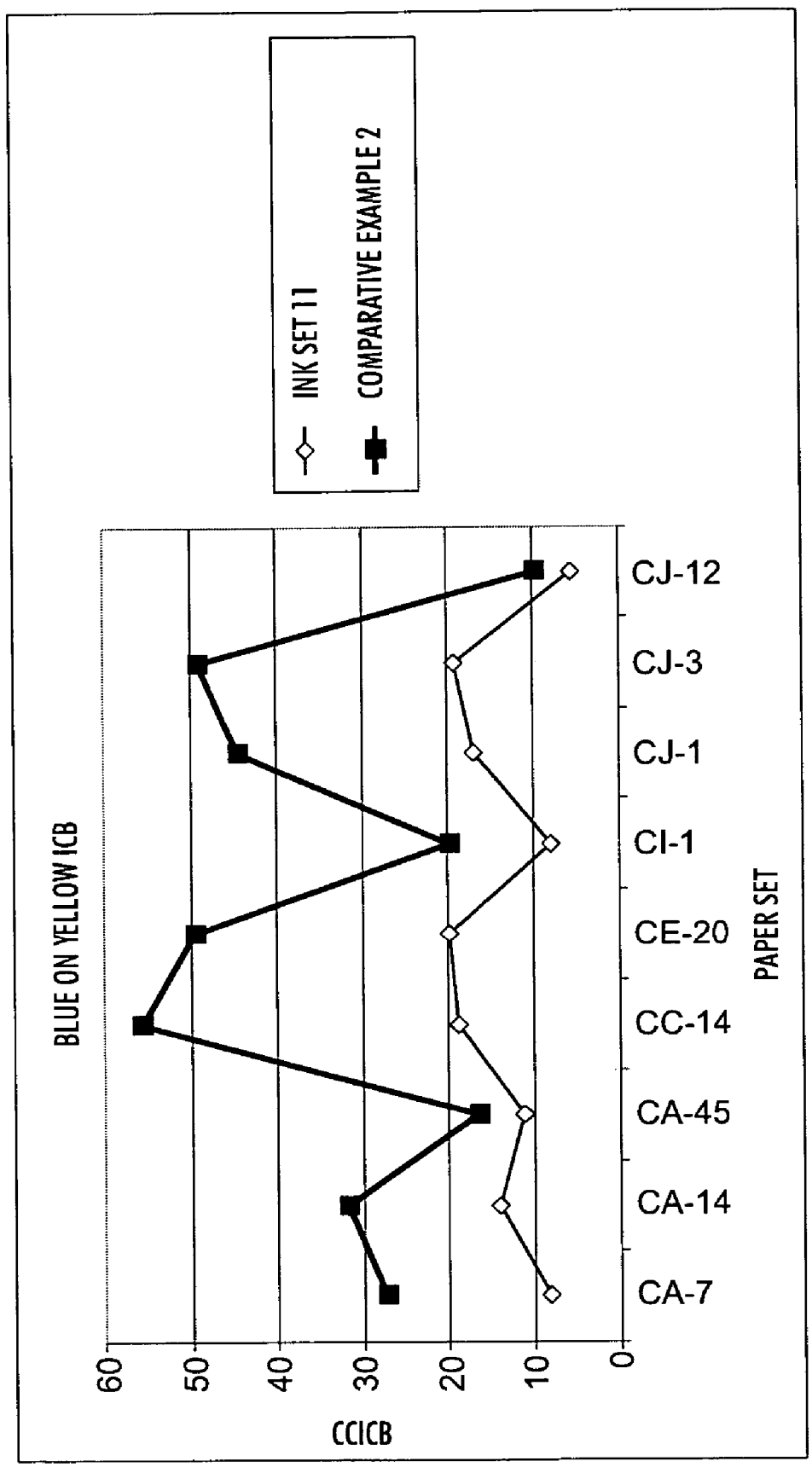
FIG. 5 is a graph comparing the blue on yellow intercolor bleed of different ink sets on various papers.

Hybrid ink sets, i.e., an ink set that includes a black/color subset with matching ink vehicles and a color/color subset with matching ink vehicles, were prepared and compared to other ink sets. Specifically, various ink sets were prepared and printed from a Xerox M750 printer onto nine different types of papers. Both black/color and color/color intercolor bleed were evaluated for each ink set on each of the nine types of paper. The vehicles used in ink compositions and the average black/color and color/color intercolor bleed over the nine papers are set forth in Table 5. In this Example, the black/color ink subset includes the black ink and the yellow ink, and the color/color subset includes the cyan ink and the magenta ink. Additionally, FIGS. 1–5 are graphs comparing the black/color and color/color intercolor bleed for Sample 11 and Comparative Example 2 on different papers.

TABLE 5

| Ink Set | Ink Vehicles | | | | Intercolor Bleed Data | | | | |
|---|---|---|---|---|---|---|---|---|---|
| | Black | Yellow | Cyan | Magenta | K/Y | K/C | K/M | R/Y | B/Y |
| 8 | C | A | A | A | 30.6 | 17.2 | 50.0 | 70.8 | 89.0 |
| 9 | A | A | A | A | 30.6 | — | — | 70.8 | 89.0 |
| 10 | A | A | E | E | 30.6 | — | — | 32.4 | 28.9 |
| 11 | C | A | F | F | 30.6 | 33.4 | 45.0 | 32.4 | 28.9 |
| Comparative Example 2 | D | E | E | E | 46.9 | 92.5 | 89.9 | 30.0 | 38.2 |
| Comparative Example 3 | C | E | E | E | 57.3 | 85.8 | 70 | 30.0 | 38.2 |
| Comparative Example 4 | A | E | E | E | 60.1 | — | — | 30.0 | 38.2 |

As seen in Tables 2 and 5, ink sets that match the ink vehicle of at least one color ink to the vehicle of the black ink reduces at least the black/color intercolor bleed as compared to conventional ink sets. Additionally, as shown in Table 5, hybrid ink sets that include an ink subset with an ink vehicle of a colored ink that matches the ink vehicle of the black ink and another subset that matches the ink vehicle of two other colored inks offer both reduced black/color intercolor bleed and color/color intercolor bleed relative to conventional ink sets. Further, the addition of a drying agent, such as butyl carbitol, in an amount of about 10 percent by weight of the ink vehicle, to the ink vehicles of the color/color subset in a hybrid ink composition provides reduced black/color and color/color intercolor bleed (see Ink Set II). The addition of about 10 percent by weight of butyl carbitol into the ink vehicles of the color/color subset of the hybrid ink set, e.g., into the vehicles for the cyan and magenta inks, reduces color/color intercolor bleed without affecting the black/yellow intercolor bleed and with only minimal impact on the black/cyan and black/magenta intercolor bleed. That is, the color/color intercolor bleed is comparable to conventional ink sets, i.e., those of Comparative Examples 2–4. The hybrid ink sets also exhibit a satisfactory black MFLEN. Despite the excellent intercolorbleed results, both the ink sets having color inks with ink vehicles that match the black ink and the hybrid ink sets tend to exhibit high secondary color mottle.

EXAMPLE III

Tests were conducted to try to improve the secondary color mottle in printing processes. In one experiment, butyl carbitol was added to the cyan, magenta, and yellow ink vehicles in an amount of 5 percent by weight of the ink vehicle. When printed, mottle was completely eliminated. Adding this amount of butyl carbitol to all the color inks had a minimal impact on black/cyan and black/magenta intercolor bleed, but did have a significant impact on black/yellow intercolor bleed.

In another test, the hybrid ink set of example 8 (matching the ink vehicles of the color inks to the black vehicle) and the hybrid ink set of example 11, which includes 10 percent by weight of butyl carbitol in the cyan and magenta ink vehicles, were also evaluated for mottle. While reducing black/color intercolor bleed and, in some instances, color/color intercolor bleed, the ink sets tended to exhibit high secondary color mottle.

In one printing trial utilizing the hybrid ink set of example 11, the yellow and cyan ink tanks were switched in the printer cartridge. This essentially changes the printing sequence of the color inks from yellow/magenta/cyan to cyan/magenta/yellow. Thus, the yellow is always printed last to make secondary colors such as, for example, green and red. Prints were made and the secondary color mottle was reduced to acceptable levels. Thus, secondary mottle is reduced by laying down faster drying colors first.

The foregoing examples show that matching the ink vehicles of at least one color ink and the black ink can reduce black/color intercolor bleed. Additionally, black/color and color/color intercolor bleed may be reduced by employing hybrid ink sets wherein the ink vehicle of one color ink and the black ink are matched and the ink vehicles of the remaining color inks are matched. Further, secondary color mottle may be reduced by printing faster drying color inks before slower drying inks.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multi-colored ink jet printing process comprising printing, in any sequence, onto a substrate:
   a first ink jet ink composition;
   a second ink jet ink composition of a different color than the first ink composition;

a third ink jet ink composition of a different color than the first and second ink compositions; and a fourth ink jet ink composition of a different color than the first, second, and third ink jet compositions;

wherein (i) each of the first, second, third and fourth ink compositions comprises a colorant and an ink vehicle, (ii) the ink vehicles of the first ink composition and the second ink composition match each other, each of the ink vehicles in the first and second ink compositions being free of a drying agent, and (iii) the ink vehicles of the third ink composition and the fourth ink composition match each other, each of the ink vehicles of the third and fourth ink compositions comprising a drying agent.

2. The multi-colored ink jet printing process according to claim 1, wherein the first ink composition is a black (K) ink and the second ink composition is yellow (Y) ink.

3. The multi-colored ink jet printing process according to claim 1, wherein said first ink is a black (K) ink, said second ink is a yellow (Y) ink, said third ink is a cyan (C) ink, and said fourth ink is a magenta (M) ink.

4. The multi-colored ink jet printing process according to claim 3 wherein the ink vehicles of said cyan and said magenta ink compositions comprises butyl carbitol in an amount of at least about 10 percent by weight of the ink vehicle.

5. The multi-colored ink jet printing process according to claim 3, wherein the ink printing sequence is selected from the group consisting of a) K, C, M, Y; b) K, C, Y, M; c) K, M, Y, C; d) K, M, Y, C; e) K, Y, C, M; f) K, Y, M, C; g) Y, C, M, K; h) Y, M, C, K i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; v) M, C, K, Y; w) M, K, Y, C; and x) M, K, C, Y.

6. The multi-colored ink jet printing process according to claim 4, wherein the ink printing sequence is selected from the group consisting of a) K, C, M, Y; b) K, C, Y, M; c) K, M, Y, C; d) K, M, Y, C; e) K, Y, C, M; f) K, Y, M, C; g) Y, C,M, K; h) Y, M, C, K i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; v) M, C, K, Y; w) M, K, Y, C; and x) M, K, C, Y.

7. The multi-colored ink jet printing process according to claim 3, wherein the ink printing sequence is selected from the group consisting of a) K, C, M, Y and b) K, M, C, Y.

8. The multi-colored ink jet printing process according to claim 4, wherein the ink printing sequence is selected from the group consisting of a) K, C, M, Y and b) K, M, C, Y.

9. An ink jet ink set comprising:
a black/color ink subset comprising
  a black ink composition comprising a colorant and an ink vehicle, and
  at least one color ink composition comprising a colorant and an ink vehicle; and
a color/color ink subset comprising a plurality of color ink compositions, each color ink composition comprising a colorant and an ink vehicle,
wherein (i) the ink vehicle(s) of the color ink composition(s) in the black/color ink subset matches the ink vehicle of the black ink composition, the ink vehicles of the ink compositions in the black/color ink subset being free of a drying agent, and (ii) the ink vehicle of at least one of the color ink compositions in the color/color ink set matches the ink vehicle of another color ink in the color/color ink subset, the ink vehicles of the ink compositions in the color/color ink subset comprising a drying agent.

10. The ink jet ink set of claim 9, wherein the ink vehicles of at least two of the color ink compositions in the color/color ink subset comprises about 10 percent by weight of a drying agent.

11. The ink jet ink set of claim 10, wherein the drying agent is butyl carbitol.

12. The ink jet ink set of claim 9, wherein the ink vehicles of the color ink compositions in the color/color ink subset matches the ink vehicle(s) of the color ink composition(s) of the black/color ink subset with the exception that the ink vehicles of the color ink compositions in color/color ink subset further comprise drying agent.

13. The ink jet ink set of claim 12, wherein the drying agent is butyl carbitol.

14. The ink jet ink set of claim 9, wherein the black/color ink subset comprises a yellow ink composition.

15. The multi-colored ink jet printing process according to claim 1, wherein the ink vehicles of the third and fourth ink jet compositions comprise the drying agent in an amount of from about 5 to about 10 percent by weight of the ink vehicles.

16. The multi-colored ink jet printing process according to claim 15, wherein the ink printing sequence is selected from the group consisting of a) K, C, M, Y; b) K, C, Y, M; c) K, M, Y, C; d) K, M, Y, C; e) K, Y, C, M; f) K, Y, M, C; g) Y, C, M, K; h) Y, M, C, K i) Y, C, K, M; I) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; v) M, C, K, Y; w) M, K, Y, C; and x) M, K, C, Y.

17. The multi-colored ink jet printing process according to claim 1, wherein the drying agent is butyl carbitol.

18. The multi-colored ink jet printing process according to claim 1, wherein the first ink composition is a black (K) ink, the second ink composition is a cyan (C) ink, the third ink composition is a magenta (M) ink, and the fourth ink composition is a yellow (Y) ink.

19. The multi-colored ink jet printing process according to claim 18, wherein the ink printing sequence is selected from the group consisting of a) K, M, Y, C, and b) K, Y, M, C.

20. The multi-colored ink jet printing process according to claim 1, wherein the first ink composition is a black (K) ink, the second ink composition is a magenta (M) ink, the third ink composition is a yellow (Y) ink, and the fourth ink composition is a cyan (C) ink.

21. The multi-colored ink jet printing process according to claim 20, wherein the printing sequence is selected from the group consisting of a) K, Y, C, M, and b) K, C, Y, M.

22. The ink jet ink set of claim 9, wherein the ink vehicles of the ink compositions in the color/color ink set each comprise from about 5 to about 10 percent by weight of a drying agent.

23. The ink jet ink set of claim 9, wherein the drying agent is butyl carbitol.

24. The ink jet ink set of claim 9, wherein the black/color ink subset comprises a cyan ink composition.

25. The ink jet ink set of claim 9, wherein the black/color ink subset comprises a magenta ink composition.

* * * * *